July 18, 1967   D. W. DANIEL   3,331,115
POT BROACH
Filed Sept. 13, 1965
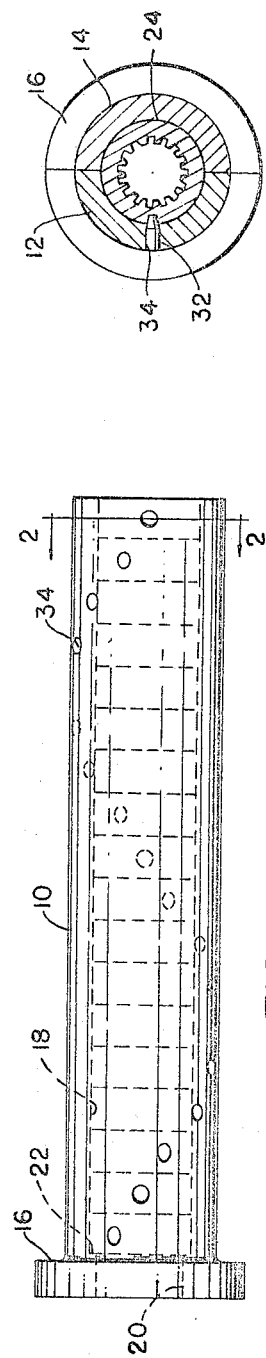
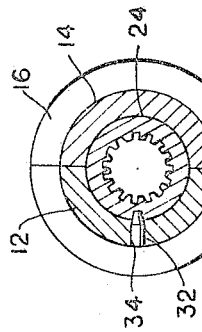
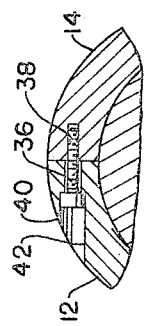
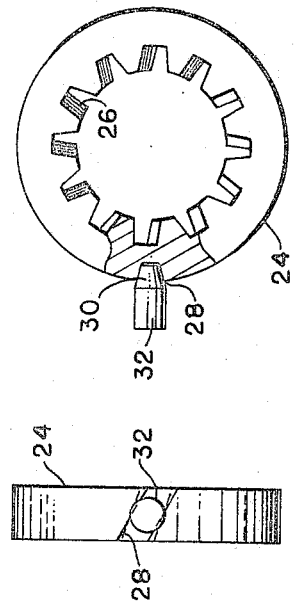
INVENTOR.
DAVID W. DANIEL
BY Whittemore,
Hulbert & Belknap
ATTORNEYS

United States Patent Office 3,331,115
Patented July 18, 1967

3,331,115
POT BROACH
David W. Daniel, Birmingham, Mich., assignor to National Broach & Machine Company, Detroit, Mich., a corporation of Michigan
Filed Sept. 13, 1965, Ser. No. 486,885
5 Claims. (Cl. 29—95.1)

The present invention relates to a pot broach, and more particularly to a pot broach comprising a generally tubular holder adapted to receive a multiplicity of separate broaching discs or wafers adapted to broach helical teeth on an external part.

It is an object of the present invention to provide a pot broach comprising an elongated tubular holder, a helically arranged series of holding elements extending to the interior of said holder, a multiplicity of broach discs or wafers having inwardly directed helical teeth and provided at the exterior thereof with a helical groove adapted to receive one of said helical elements.

It is a further object of the present invention to provide a broach as described in the preceding paragraph in which the holding elements on the holder, the grooves at the exterior of the broach wafers, and the cutting teeth of the boach wafers are all also disposed in a helical path having the same lead.

More specifically, it is a further object of the present invention to provide a pot broach as described in the foregoing in which the holding elements are in the form of pins having conically formed nose portions adapted to project into the interior of the tubular holder, the helically disposed slots on the periphery of the wafers having inclined side walls to interfit accurately with the conically tapered nose.

It is a further object of the present invention to provide a pot broach of the type described in the foregoing in which the holder is formed of two generaly semi-cylindrical parts removably secured together.

Other objects and features of the invention will become apparent as the description proceeds, especially when taken in conjunction with the accompanying drawing, illustrating a preferred embodiment of the invention, wherein:

FIGURE 1 is a side elevation of the broach holder.
FIGURE 2 is a sectional view on the line 2—2, FIGURE 1, showing a broach disc or wafer in place.
FIGURE 3 is an enlarged edge elevational view of a single broach disc or wafer.
FIGURE 4 is a side elevational view of the wafer shown in FIGURE 3, partly in section.
FIGURE 5 is a fragmentary sectional view, on an enlarged scale, through the holder illustrating the connection between the halves thereof.

Referring now to the drawings, the broach comprises an elongated generally cylindrical holder 10 longitudinally split as indicated in FIGURE 2, into the two generally semi-cylindrical portions 12 and 14. At one end the holder is provided with a radially extending flange 16 by means of which it may be attached to a suitable ram or holder provided on a broaching machine. The interior of the holder is generally cylindrical as indicated at 18 and at its upper end there is a radially extending flange 20 providing a shoulder 22 against which the assembly of broach discs or wafers seats.

An individual broach wafer 24 is illustrated in FIGURES 3 and 4 and comprises an annular body provided at its interior with helically inclined cutting teeth 26. The outer periphery of the wafer 24 is cylindrical and is provided along one side thereof with a helically inclined tapered locating slot 28 designed to receive the conically tapered nose 30 of a locating pin 32 as will subsequently be described. The teeth 26 are at a smaller radial distance from the axis of the wafer 24 than is the helical groove 28. The teeth 26 and locating slot 28 are provided to extend at the same lead. Therefore, the helix angle of the locating groove 28 is larger than the nominal helix angle of the teeth 26.

It will of course be appreciated that the series of wafers 24 are arranged to have longitudinally stepped teeth, as is conventional in broaches, so that axial movement of the assembly of holder and wafers over a circular workpiece will form teeth thereon by a multiplicty of succesive cuts.

In order that the teeth of the disc or wafer 24 shall be properly disposed in helical alignment, it is essential to locate each of the wafers in exact alignment with the adjacent wafers. This is accomplished by the locating pins 32 which as best seen in FIGURE 2, extend radially inwardly through openings 34 in the tubular holder 10.

It is of course essential that each of the wafers 24 shall have its helically inclined locating slot 28 located with exactness with reference to the teeth at the interior thereof. This can best be accomplished by providing the required number of wafers with the identically inclined exterior helical slots 28 and using these slots as the means for locating the wafers in the tooth forming and finishing operations.

In assembly, a multiplicity of wafers are assembled in the correct order with the flat end surfaces thereof in engagement, the uppermost of these wafers being engaged against the annular seat 22. Suitable means may be provided for retaining all of the wafers in assembled relation, such for example as means carried by the holder 10 engaging with the lowermost wafer at the end of the holder remote from the flange 16. While the thickness of the wafers may be maintained with a high degree of accuracy, it is nevertheless possible for thicknes errors to be cumulative so that it is as a practical matter impossible to assure the exact position of any particular wafer axially or longitudinally of the holder. However, such an error does not introduce errors into the alignment of teeth and does not introduce errors of any kind into the finished work piece. This of course is because each of the wafers takes its location in rotation from a particular locating pin 32 engageable in a properly helically inclined groove. To illustrate the result of this relationship it wil be observed that it is only necessary for each of the pins 32 to engage one of the wafers 24 somewhere intermediate its flat ends. Similarly, the spacing of the individual pin receiving openings 34 does not require great accuracy except that these shall be located with exactnes along a helix provided with proper lead and that they be located such that a pin received therein will engage in a slot of a single wafer intermediate the ends thereof. If, for example, one of the wafers were arbitrarily reduced in thickness by a substantial amount, this would not affect the helical alignment of the teeth of that particular wafer nor of any of the remaining wafers.

In FIGURE 5 there is illustrated the interconnection between the two generally semi-cylindrical halves 12 and 14 of the holder which comprise connecting screws 36 received in tapped openings 38 and having enlarged heads 40 received in the enlarged countersunk opening 42. It will be appreciated that if each holder half 12 and 14 is provided along one edge with tapped openings 38 and along the opposite edge with the countersunk openings 42, the parts may be identical.

The drawing and the foregoing specification constitute a description of the improved pot broach in such full, clear, concise and exact terms as to enable any person skilled in the art to practice the invention, the scope of which is indicated by the appended claims.

What I claim as my invention is:
1. A broach assembly comprising an elongated tubular holder, a multiplicity of separate annular broach wafers received in said holder, said wafers having radially in- wardly extending helically disposed cutting teeth and having outer cylindrical surfaces provided with a helically extending locating slot extending at the same lead as the helically disposed teeth, said holder having a series of locating elements arranged in helical alignment at a lead identical with the lead of the locating slots and teeth of the broach wafers, each of said locating elements having a portion interfitting into a locating slot of one of said wafers.

2. A broach assembly as defined in claim 1 in which said locating elements are in the form of pins extending radially inwardly from the interior surface of said tubular holder.

3. A broach assembly as defined in claim 2 in which the radially inwardly projecting portion of said locating elements is conically formed and in which the locating slots provided in the outer surfaces of said wafers have side walls correspondingly inclined to interfit therewith.

4. A broach assembly as defiend in claim 3 in which said holder is provided with a series of helical aligned cylindrical openings, and in which said locating elements are in the form of cylindrical pins received in said openings.

5. A broach assembly as defined in claim 1 in which said holder is formed of two generally semi-cylindrical portions and fastening elements extending through the abuting edge surfaces thereof to retain the holder in assembled relation.

No references cited.

HARRISON L. HINSON, *Primary Examiner.*